United States Patent
Thoroddsen et al.

(10) Patent No.: US 12,510,473 B2
(45) Date of Patent: Dec. 30, 2025

(54) SYSTEM AND METHOD FOR DETERMINING DEMULSIFIER FOR SEPARATING WATER FROM WATER EMULSION

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Sigurdur Tryggvi Thoroddsen, Thuwal (SA); Yuansi Tian, Thuwal (SA); Ziqiang Yang, Thuwal (SA); Ehab Elsaadawy, Dhahran (SA)

(73) Assignees: KING ABDULLAH UNIVERSITY OF SCIENCE AND TECHNOLOGY, Thuwal (SA); SAUDI ARABIAN OIL COMPANY, Dhahran (SA)

( * ) Notice: Subject to any disclaimer, the term of this patent is extended or adjusted under 35 U.S.C. 154(b) by 969 days.

(21) Appl. No.: 17/637,202

(22) PCT Filed: Aug. 18, 2020

(86) PCT No.: PCT/IB2020/057780
§ 371 (c)(1),
(2) Date: Feb. 22, 2022

(87) PCT Pub. No.: WO2021/044245
PCT Pub. Date: Mar. 11, 2021

(65) Prior Publication Data
US 2022/0397522 A1 Dec. 15, 2022

Related U.S. Application Data

(60) Provisional application No. 62/895,622, filed on Sep. 4, 2019.

(51) Int. Cl.
*G01N 21/3577* (2014.01)
*B01D 17/04* (2006.01)
*G01N 21/359* (2014.01)

(52) U.S. Cl.
CPC ......... *G01N 21/359* (2013.01); *B01D 17/047* (2013.01); *G01N 21/3577* (2013.01)

(58) Field of Classification Search
CPC ............. G01N 21/359; G01N 21/3577; G01N 33/2823; G01N 33/18; G01N 11/04;
(Continued)

(56) References Cited

U.S. PATENT DOCUMENTS 9,579,616 B2  2/2017 Malloggi et al.
2005/0172476 A1* 8/2005 Stone ................ B01F 23/41
                                                    29/592.1

(Continued)

FOREIGN PATENT DOCUMENTS

CN    104853616 A    8/2015
CN    108472263 B    2/2022
KR   1020190004286 A  1/2019

OTHER PUBLICATIONS

First Office Action and Search Report in corresponding/related Chinese Application No. 202080070152.2, dated Aug. 4, 2023.
(Continued)

*Primary Examiner* — Dean Kwak
(74) *Attorney, Agent, or Firm* — PATENT PORTFOLIO BUILDERS PLLC

(57) ABSTRACT

A method for selecting a demulsifier and its concentration that is most efficient in separating water from oil includes mixing dry oil with a demulsifier to obtain a mixture having a first concentration; generating water droplets inside the mixture; pumping the water droplets and the mixture into a micro-fluidic channel; sending a laser beam through the
(Continued)

micro-fluidic channel; recording images of the water droplets in the mixture with a camera; and calculating a percentage of the water droplets that coalescence inside the micro-fluidic channel when free-falling through the mixture, due to gravity.

12 Claims, 16 Drawing Sheets

(58) Field of Classification Search
CPC .. G01N 13/00; G01N 2021/8405; G01N 1/38; G01N 2011/008; G01N 2021/1765; G01N 24/082; G01N 33/2847; B01D 17/047; B01D 17/02

See application file for complete search history.

(56) References Cited

U.S. PATENT DOCUMENTS

| | | | |
|---|---|---|---|
| 2007/0195127 A1* | 8/2007 | Ahn | G01N 15/1404 347/55 |
| 2008/0003142 A1* | 1/2008 | Link | B01L 3/502784 264/219 |
| 2011/0000560 A1 | 1/2011 | Miller et al. | |
| 2014/0187664 A1 | 7/2014 | Malloggi et al. | |
| 2015/0351430 A1 | 12/2015 | Pipe et al. | |
| 2017/0145169 A1 | 5/2017 | Oakey et al. | |
| 2017/0319984 A1 | 11/2017 | Oshinowo | |
| 2017/0336306 A1* | 11/2017 | Miller | B01L 3/502784 |
| 2018/0246020 A1* | 8/2018 | Kitagawa | G01N 1/38 |
| 2019/0247770 A1 | 8/2019 | Oshinowo | |

OTHER PUBLICATIONS

Lin, Y.-J., et al., "Microfluidic Investigation of Asphaltenes-Stabilized Water-in-Oil Emulsions," Energy Fuels, Mar. 20, 2018, vol. 32, pp. 4903-4910, ACS Publications.

Yanes, J.F.R., et al., "Experimental Study of the Phase Behavior of Methane and Crude Oil Mixtures," Fuel, Jul. 24, 2019, vol. 255, pp. 115850 1-11, Elsevier Ltd.

Second Office Action in corresponding/related Chinese Application No. 202080070152.2, dated Jan. 26, 2024.

Aquino, J.D.S., et al., "Refining of Buriti Oil (*Mauritia flexuosa*) Originated from the Brazilian Cerrado: Physicochemical, Thermal-Oxidative and Nutritional Implications," Journal of the Brazilian Chemical Society, Oct. 13, 2012, vol. 23, No. 2, pp. 212-219.

International Search Report in corresponding/related International Application No. PCT/IB2020/057780, date of mailing Oct. 20, 2020.

Loufakis, D.N., et al., "A Microfludic Technique for the Evaluation of Demulsifiers," Society of Petroleum Engineers, In SPE International Conference on Oilfield Chemistry, Montgomery, Texas, USA, Apr. 3-5, 2017, pp. 1-9.

Written Opinion of the International Searching Authority in corresponding/related International Application No. PCT/IB2020/057780, date of mailing Oct. 20, 2020.

Zhao, Y., et al., "High-Accuracy Low-Water-Content Measurement of Crude Oil Based on a Near-Infrared Spectral Absorption Method," Optical Engineering, Oct. 2004, vol. 43, No. 10, pp. 2216-2217, Society of Photo-Optical Instrumentation Engineers.

Notice of Preliminary Rejection in corresponding/related Korean Application No. 10-2022-7010896, issued Sep. 24, 2025.

* cited by examiner

| DIAMETER OF DROPLET / μm | T = 1 min | T = 5 min | T = 10 min |
|---|---|---|---|
| 90 | 1.7% | 2.4% | 4.4% |
| 130 | 1.5% | 2.0% | 3.7% |
| 150 | 2.4% | 1.5% | 1.2% |
| 185 | 2.2% | 2.3% | 2.0% |
| 210 | 2.0% | 1.4% | 1.5% |

FIG.8

SYSTEM AND METHOD FOR DETERMINING DEMULSIFIER FOR SEPARATING WATER FROM WATER EMULSION

CROSS-REFERENCE TO RELATED APPLICATIONS

This application is a U.S. National Stage Application of International Application No. PCT/IB2020/057790, filed on Aug. 18, 2020, which claims priority to U.S. Provisional Patent Application No. 62/895,622, filed on Sep. 4, 2019, entitled "SYSTEM AND METHOD FOR DETERMINING DEMULSIFIER FOR SEPARATING WATER FROM WATER EMULSION," the disclosures of which are incorporated herein by reference in their entirety.

BACKGROUND

Technical Field

Embodiments of the subject matter disclosed herein generally relate to a system and method for separating water from a water emulsion, and more particularly, to testing the efficiency of one or more demulsifiers within a micro-fluidic channel-based system.

Discussion of the Background

The process of separating water drops from a water emulsion requires an appropriate demulsifier/surfactant. The selection of the demulsifier and its concentration or volume ratio depends on many parameters, some of them being the other components of the emulsion and their concentrations.

In the petroleum industry, the separation of water from the extracted crude oil is required before processing for the following reasons. When the crude oil is processed at refineries, the water present in the crude oil might corrode the pipes and other equipment used by these refineries. As this equipment is expensive, it is a requirement in the industry to have the water removed from the crude oil prior to being processed. A large amount of water is present in the crude oil for the following reasons. During the Enhanced-Oil-Recovery procedure at a well, water is pumped into the underground reservoir to raise the pressure of the reservoir in order to extract the underlying oil. Also, for shale explorations, the well is fractured to produce more paths for the oil to flow into the well. The process of fracturing involves pumping water with other chemicals at a high pressure inside the well, and then forcing this mixture into the subsurface surrounding the well, to open more paths between the well and the oil reservoir. The water is pressurized in both operations and effectively stirred with the crude oil in the reservoir, thus generating the water-oil emulsion that is extracted from the well.

To separate the water from this emulsion, a chemical surfactant (demulsifier) is added to the crude oil to enhance the coalescence of water droplets. This demulsifier is typically formulated with polymeric chains of ethylene oxides and polypropylene oxides of alcohol, ethoxylated phenols, ethoxylated alcohols and amines, ethoxylated resins, ethoxylated nonylphenols, polyhydric alcohols, and sulphonic acid salts. It is important to select an optimal type and concentration of the demulsifier for a given water-oil emulsion or otherwise the entire process is not efficient, water is left in the crude oil, and damage to the refinery equipment may be inflicted during the processing phase of the crude oil.

To select the most effective demulsifier for a given crude oil sample, the current testing and screening method is the laboratory "bottle test," which involves adding manually to a bottle an amount of the crude oil emulsion and an amount of the demulsifier. Different types and concentrations of the demulsifier are added to the same crude oil emulsion in different bottles for testing. This is a tedious process, but it is widely used in the petroleum industry. After plural bottles are prepared as discussed above, the bottles are placed in a centrifuge for distributing the demulsifier into the crude oil and also trying to separate the water from the crude oil. After the bottles were centrifuged for a given amount of time, the coalesced water volume fraction from each bottle is measured and analyzed, to determine the optimal demulsifier and its concentration.

However, the bottle test is not only tedious and slow, but is a static test that does not reflect, accurately, the real dynamic flow conditions that take place in an actual separator.

A new method for determining the appropriate demulsifier has been proposed in [1]. The method in [1] proposed one micro-fluidic device to generate small droplets and test when they coalescence in the micro-channel. However, the device in [1] is not able to generate a shear flow that is similar with the real conditions.

Thus, there is a need for a new test that recreates the dynamics of the water droplets in the crude oil flow, can be performed in a shorter amount of time, is not as laborious as the existing tests, and avoids the deviation induced by the static bottle test.

BRIEF SUMMARY OF THE INVENTION

According to an embodiment, there is a method for selecting a demulsifier and its concentration that is most efficient in separating water from oil. The method includes mixing dry oil with a demulsifier to obtain a mixture having a first concentration, generating water droplets inside the mixture, pumping the water droplets and the mixture into a micro-fluidic channel, sending a laser beam through the micro-fluidic channel, recording images of the water droplets in the mixture with a camera, and calculating a percentage of the water droplets that coalescence inside the micro-fluidic channel when free-falling through the mixture, due to gravity.

According to another embodiment, there is a demulsifier testing system that includes a micro-fluidic channel having at least two sides smaller than 1 mm, wherein the micro-fluidic channel extends along a vertical direction, a laser source configured to generate a laser beam, wherein the laser beam is directed to pass through the micro-fluidic channel, a camera positioned to receive the laser beam after passing through the micro-fluidic channel, and a mono-dispersed droplet generation mechanism fluidly connected to the micro-fluidic channel. The mono-dispersed droplet generation mechanism is configured to generate water droplets into a mixture of dry oil and a demulsifier.

BRIEF DESCRIPTION OF THE DRAWINGS

For a more complete understanding of the present invention, reference is now made to the following descriptions taken in conjunction with the accompanying drawings, in which:

FIG. 8 lists the polydispersity of water droplets generated by the microfluidic device, versus time;

DETAILED DESCRIPTION OF THE INVENTION

Figure 1A:
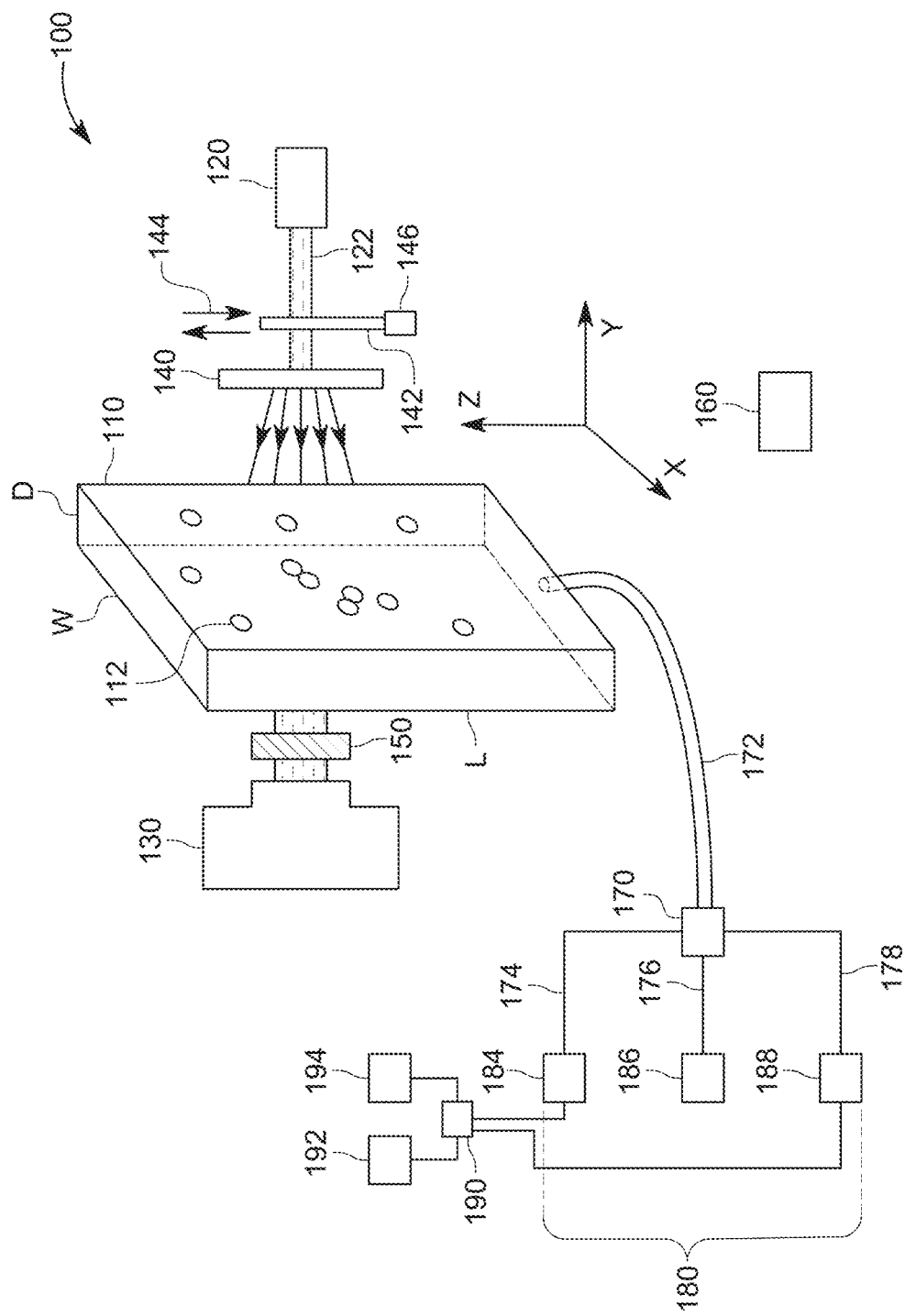
FIG. 1A is a schematic diagram of a demulsifier testing system having a single micro-fluidic channel.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a system that uses one or more micro-fluidic channels for determining the coalescence propensity of water droplets in crude oil. However, the embodiments to be discussed next are not limited to separating water from a water emulsion, but may be applied to determining an appropriate demulsifier for any emulsion.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel demulsifier testing system includes one or more micro-fluidic channels in which a controlled amount of a particular demulsifier, water and oil are introduced and allowed to free fall for quantifying the prevalence and number of coalescence events for the particular emulsion. The water-droplets are allowed to free-fall slowly under gravity in one or more long micro-fluidic channels. This slow settling of the water drops provides long interaction times between adjacent droplets, which makes it more likely that they would coalesce. Free-falling in a small channel makes the droplets move at different velocities and therefore have a tendency to pass by one another and experience shearing motions, which can enhance the coalescence process, similar to the real conditions when the demulsifier is added to the crude oil in the refinery separation vessels. To identify any coalescence events, the system uses a flow-focusing device for feeding uniform-size water-droplets into the micro-fluidic channel. The system also includes a camera to image the water drops as they settle down towards the bottom of the micro-fluidic channel. A high-speed video camera, sensitive to near-infrared light, which is capable of passing through the opaque crude oil, is used to image the water droplets. A laser device is included into the system to generate the near-infrared light. The size of the water droplets, as recorded by the camera, are analyzed and they are indicative of the occurrence of any coalescences, as the process of coalescence increases the size of the droplets. By comparing the number of coalescences for each given emulsion for various concentrations, and how quickly these events have taken place is used as an indicator of the effectiveness of the demulsifier. This novel testing system and method are now discussed in more detail with regards to the figures.

Figure 1B:
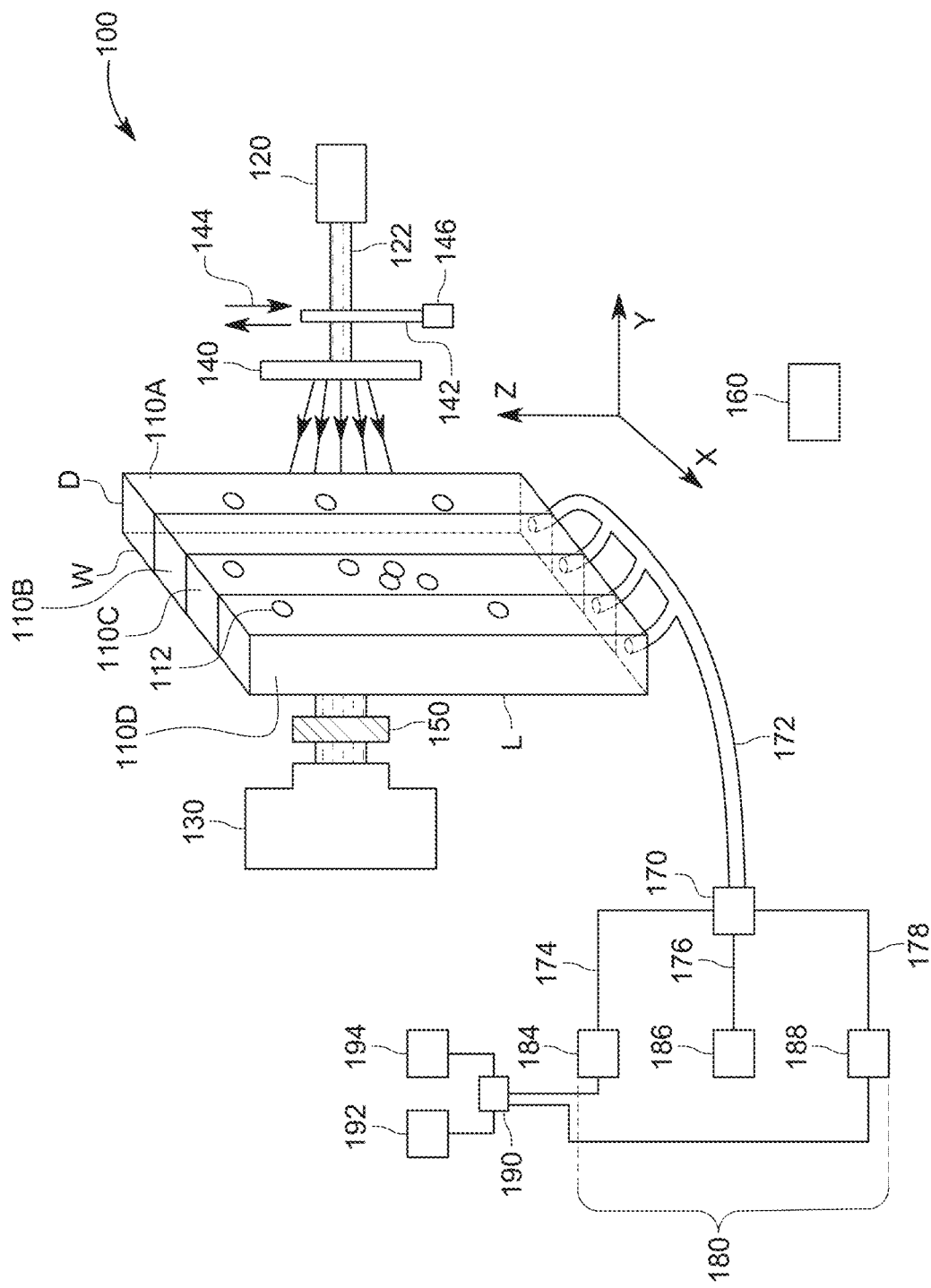
FIG. 1B is a schematic diagram of a demulsifier testing system having plural micro-fluidic channels.

FIG. 1A shows a demulsifier testing system 100 that includes a micro-fluidic channel 110 placed between a light source 120 and a high-speed camera 130. The light beam 122 emitted by the light source 120 is directed through a static diffuser 140 before entering the micro-fluidic channel 110. One or more lenses 150 may be placed behind the micro-fluidic channel 110 and in front of the high-speed camera 130, for focusing the light reflected/refracted from the droplets 112 present in the micro-fluidic channel 110. A controller 160 may be connected in a wired or wireless manner to each of these elements for controlling them, as discussed later. FIG. 1B shows a similar configuration with the difference that instead of using a single micro-fluidic channel 110, plural channels 110A to 110D are used. Although FIG. 1B shows four micro-fluidic channels set up in parallel, one skilled in the art would understand that fewer or more channels distributed in parallel may be used.

The micro-fluidic channel 110, which is not drawn to scale in the figures, has at least one side, e.g., its width W or its depth D between 100 µm and 1 mm. In one application, both sides W and D have sizes in this range. In one embodiment, a cross-section of the micro-fluidic channel 110 is a square, i.e., W=D. For this embodiment, the width and depth of the channel can be about 500 µm. In another embodiment, a cross-section of the micro-fluidic channel 110 is a rectangle. The square or rectangle shape is advantageous for the following reasons. The water droplets, as discussed later, are falling from the top of the channel 110 toward its bottom. If a 2-D channel (which has an interior diameter smaller than the droplet's diameter) is used as in [1], then there is not enough space for the water droplets to pass each other, i.e., the water droplets have a single degree of freedom, along the gravity direction described by axis Z in the figure.

However, by having a square or rectangle cross section for the micro-fluidic channel 110 as shown in FIG. 1A, the water droplets have an extra degree of freedom, along the X axis. In other words, the water droplets can move not only along the Y axis, but also along the X axis and interact with other water droplets. Note that the depth D along the Y axis cannot be increased over a certain level because the crude oil is opaque, and not enough light would be passing to the high-speed camera for distinguishing the water droplets. A length L of the micro-fluidic channel 110 may vary between 100 mm to 2 m. The experiments performed by the inventors used a 300 mm long channel 110. The micro-fluidic channel 110 is placed in a vertical position, i.e., its length L is aligned with the vertical axis Z, so that the water droplets fall under the gravity from the top of the channel 110 to its bottom. In one embodiment, the micro-fluidic channel 110 may be placed at a non-zero angle relative to the vertical axis Z and still achieve the same results.

Figure 2A:
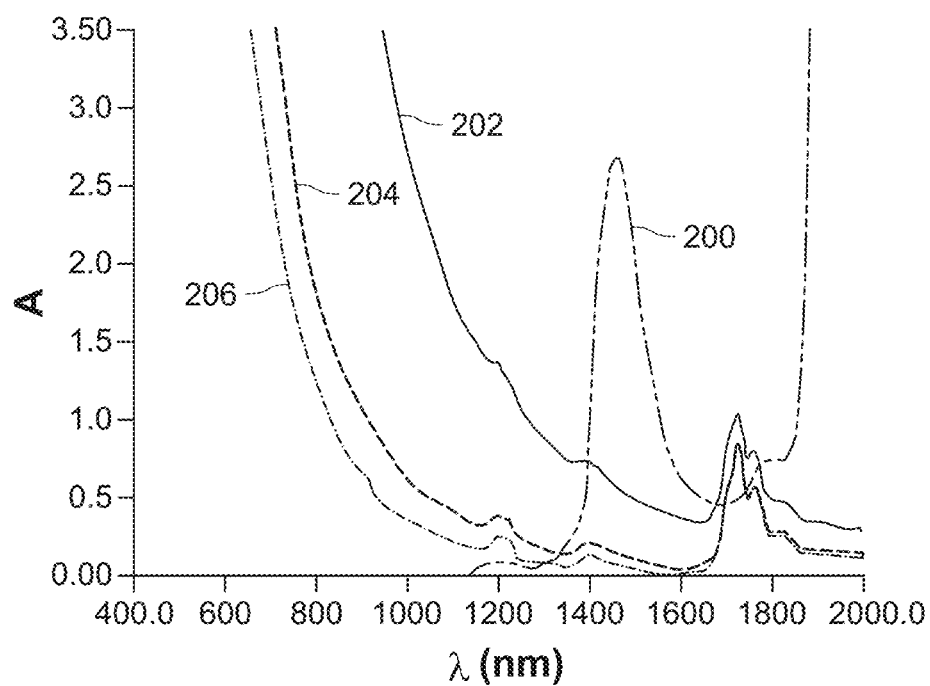
FIGS. 2A and 2B illustrate the light absorbance of various oils and water.
Figure 2B:
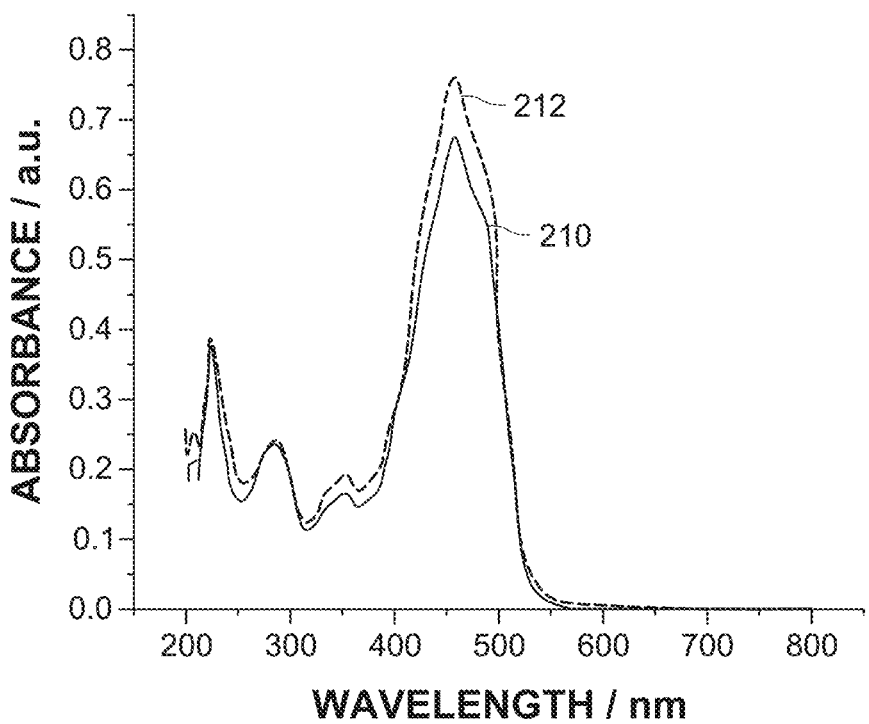

The light source 120 may be implemented as one or more near-infrared range (NIR) laser diodes. The NIR is defined as being a light having a wavelength in the range of 705 to 2000 nm. However, the usable NIR light for the system 100 is restricted by the following two factors. One is the light absorption of the crude oil, and the other is the sensitivity of the camera sensor. In order to have enough illumination and less light intensity loss, the 980 nm wavelength has been chosen for the experiment performed by the inventors. The crude oil has a relative low absorption in the range from 800 nm to 1600 nm as illustrated in FIGS. 2A and 2B (which correspond to FIG. 1 of [2] and FIG. 1 of [3], respectively), which is in the range of NIR laser (705 nm-2000 nm). FIG. 2A shows the absorption spectrum of water (curve 200) and various crude oils (curve 202 for 24 API crude oil, curve 204 for 30 API crude oil, and curve 206 for 38 API crude oil) while FIG. 2B shows the absorption spectrum of the crude oil (curve 210) and refined oil (curve 212). Note that in FIG. 2A, the y-axis term A is the wavelength-dependent molar absorptivity coefficient with units of $M^{-1}cm^{-1}$ and this term is derived from the Beer-Lambert Law, which states that $-\log (I/I_0)=A(\lambda)\times C\times L$, where C is the concentration of the solution, L is the transmitting length, and I and $I_0$ represent the light intensity of the transmitting and initial light, respectively. However, the CMOS sensor of the camera is not able to work efficiently above 1100 nm. Therefore, the wavelength of the NIR laser used in the system 100 is selected to be in the range from 800 nm to 1100 nm.

Figure 3:
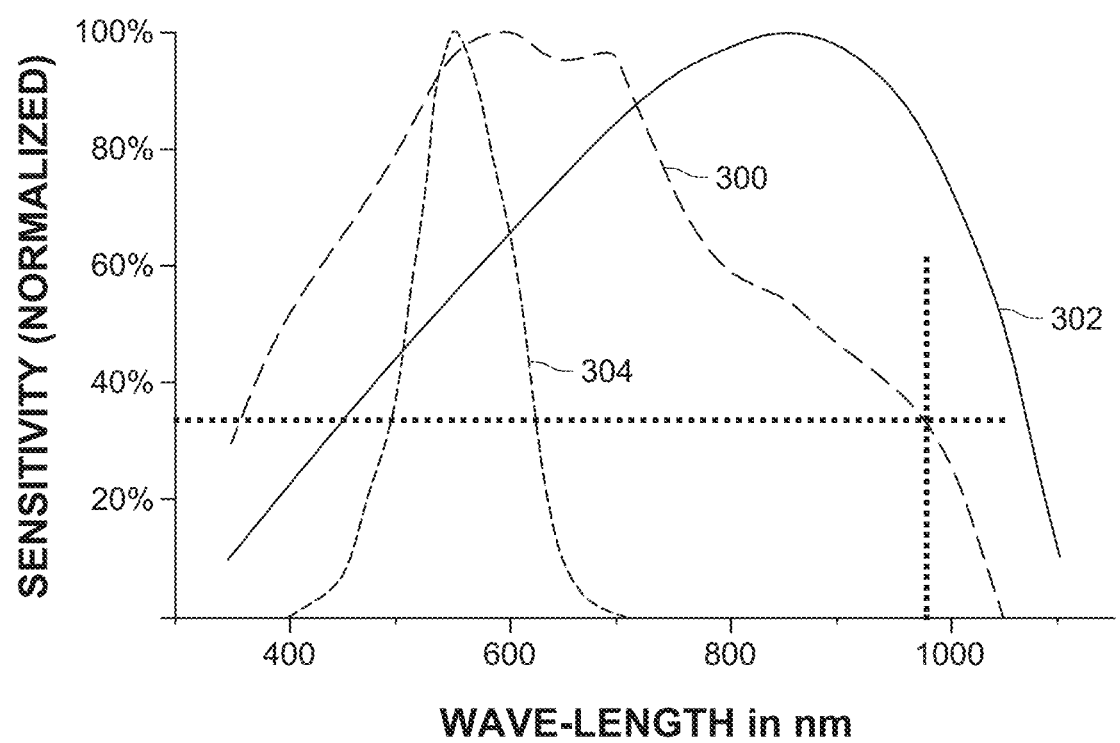
FIG. 3 illustrates the spectral sensitivity to light of various cameras and the human eye.

The diffuser 140 is placed between the light source 120 and the micro-fluidic channel 110 to diffuse the focused light beam 122. The high-speed camera 130 may be implemented as a CMOS high-speed camera Photron SA5. Such a camera can acquire full-frame images (1280 px×800 px) at frame rates as high as 7000 fps. Higher frame-rates can be achieved if observing smaller pixel areas. The camera is attached to a lens 150, for example, a Leica microscopic lens (Z16 APO) with adjustable magnification, aperture and focus. The typical magnification is 8, giving 2.5 µm/px resolution. FIG. 3 illustrates the spectral sensitivity for (1) the CMOS camera sensor as curve 300, (2) a CCD camera as curve 302, and (3) the human eye as curve 304. It is noted that the CMOS camera sensor curve 300 is able to detect NIR light with a sensitivity of about 35% for the NIR light (at a wavelength of 980 nm), which is enough for the purpose of this method.

Figure 4:
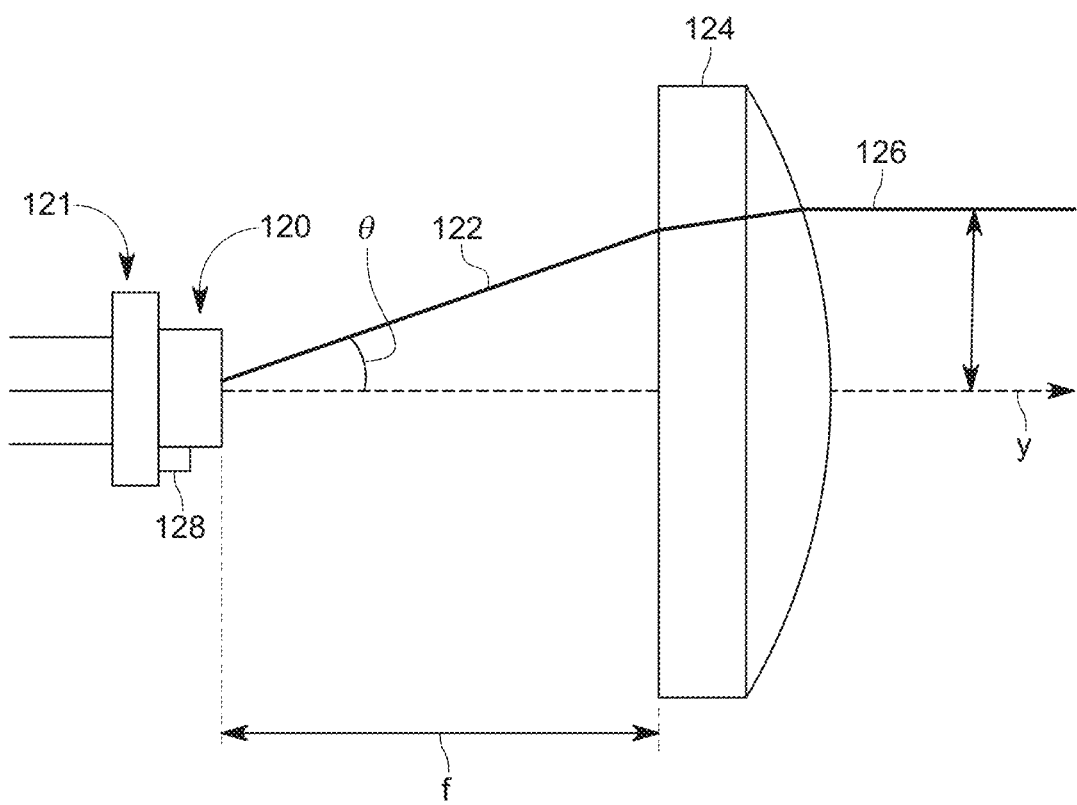
FIG. 4 illustrates a device for optical collimation of near-infrared light.

In one embodiment, the laser diode 120 is installed in a specialized heat-exchanger mount 121 along with a dedicated collimation lens 124. The collimated beam 126's diameter in this embodiment is around 3.0 mm (r=1.5 mm) according to the focal length (f=5.6 mm) of the diode, as illustrated in FIG. 4. An angle θ formed between the horizontal axis Y and most external ray of the beam 122 is about 15 degrees for this configuration. The laser diode 120 may be driven by a power controller 160 with a maximum power of 200 mW. The system 100 may also include a temperature controller 128, as shown in FIG. 4, for preventing thermal damage to the laser diode. The system is configured to accept various laser diodes, i.e., have interchangeable diodes of different wavelengths.

Figure 5A:
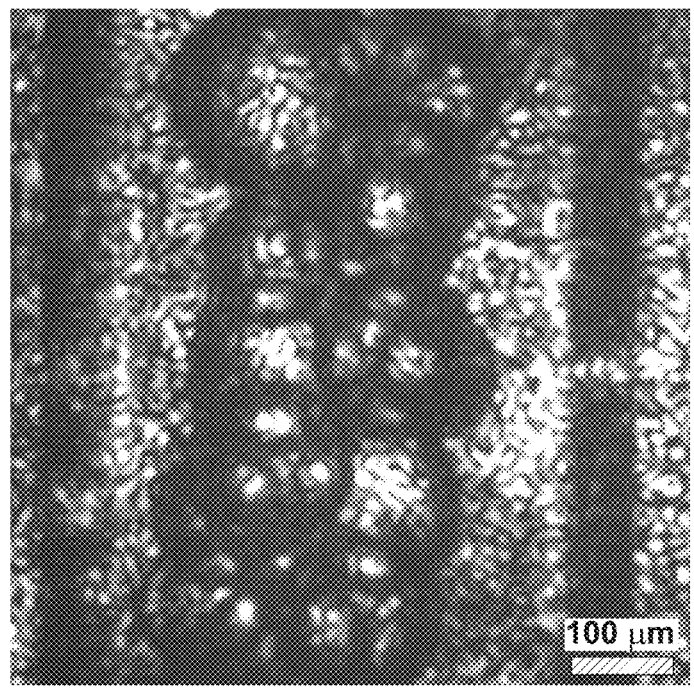
FIGS. 5A and 5B illustrate how a translating diffuser improves the quality of images taken with near-infrared light.
Figure 5B:
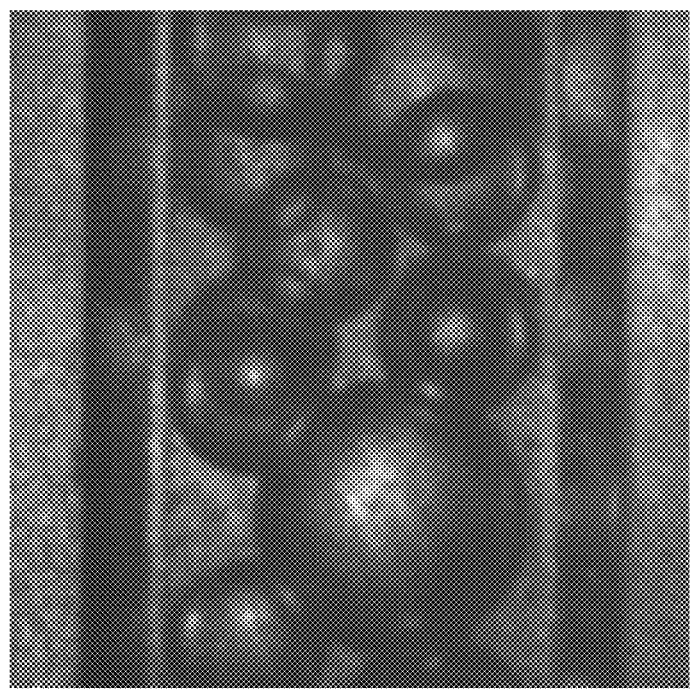

As the system is trying to detect the coalescence of the water droplets while falling along the micro-fluidic channel 110, the image quality generated by the high-speed camera 130 needs to be at its best. Besides the quality of the camera, other factors play a role in the quality of the image. For example, it was observed that the image quality is also dependent on the background diffuser 140, due to the speckle pattern. By using two diffusers 140 and 142 instead of one, a better image quality is obtained, i.e., by using one static diffuser 140 as well as a rapidly moving diffuser 142. In one application, only one diffuser is used, but the diffuser is moved up and down as indicated by arrows 144 in FIGS. 1A and 1B. A motor 146 may be used to automatically move the diffuser 142 up and down or rotate it in the x-z plane. The motor 146 may be controlled by the controller 160. In this way, the quality of the image taken by the camera 130 may be improved, as shown in FIGS. 5A and 5B. FIG. 5A shows the image of the water droplets in crude oil taken with a single stationary diffuser, while FIG. 5B shows the image of the similar water droplets taken with a stationary diffuser and a moving diffuser. The image quality of FIG. 5B is much improved relative to that of FIG. 5A.

Returning to FIG. 1A, a mono-dispersed droplet generation mechanism 170 is used to generate water droplets in the crude oil to form a water-in-oil emulsion. The water emulsion is then pumped, through a connecting tube 172, to the micro-fluidic channel 110. Because FIG. 1A is not at scale, the connecting tube 172 appears disproportionately smaller than the micro-fluidic channel 110. However, in reality, a diameter of the connecting tube 172 is comparable to a diameter of the micro-fluidic channel 110.

The mono-dispersed droplet generation mechanism is connected with corresponding tubes 174, 176, and 178 to a pumping system 180 that is configured to control an amount of water relative to an amount of crude oil that is inserted into the micro-fluidic channel 110. In one embodiment, the pumping system 180 includes three independent pumps 184, 186, and 188, each connected to the corresponding tubes 174, 176, and 178, respectively. Two of the pumps 184 and 188 are configured to inject a mixture of the crude oil and demulsifier into the corresponding tubes 174 and 178 while the pump 186 is configured to inject the water into the tube 176.

Figure 6A:
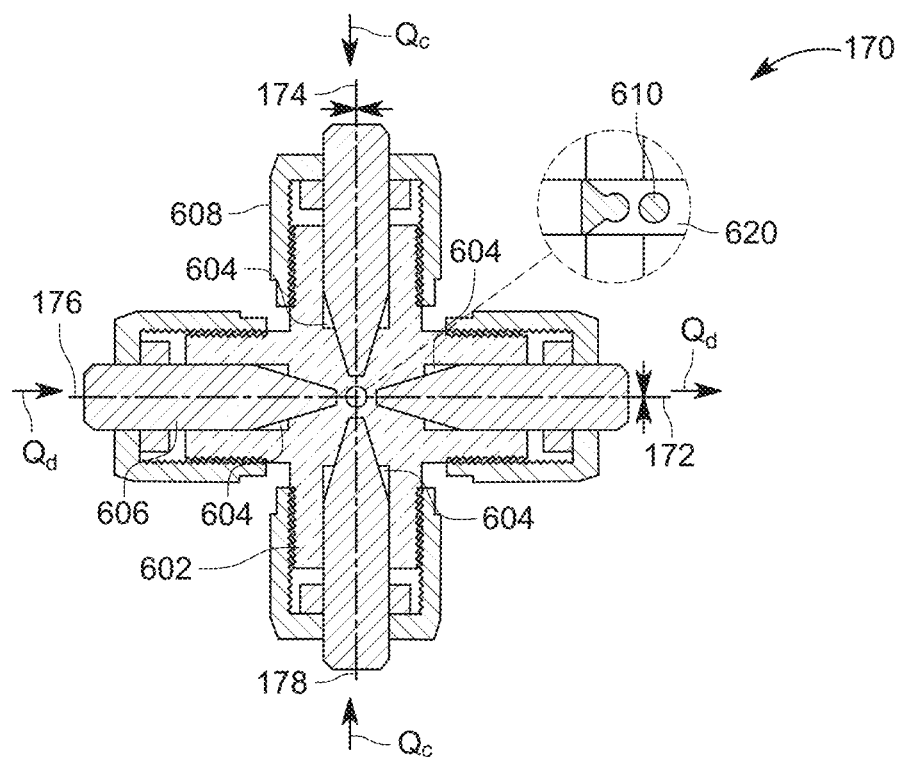
FIGS. 6A and 6B illustrate a mono-dispersed droplet generation mechanism for generating water droplets in oil.
Figure 6B:
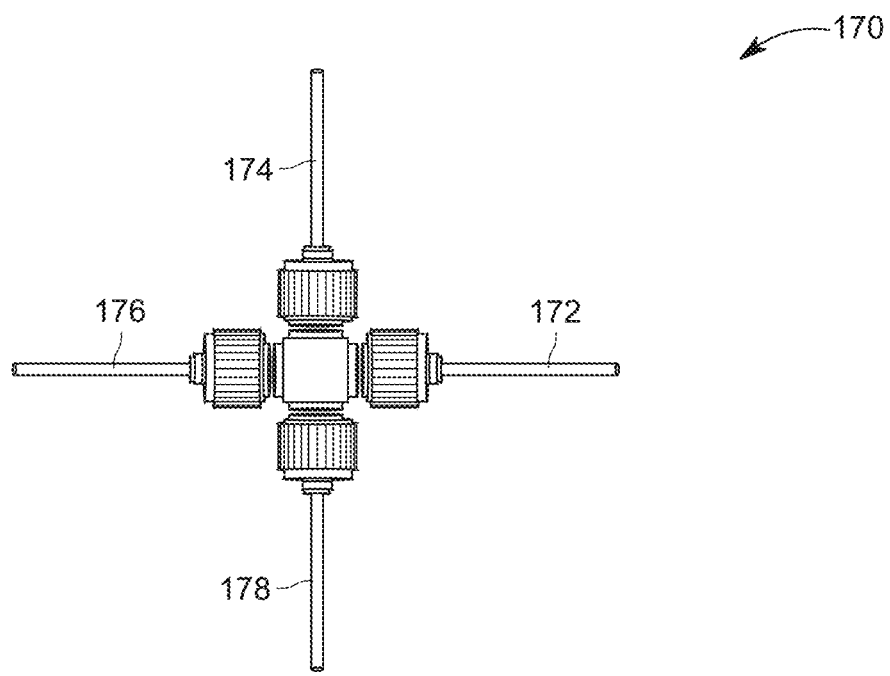

The mono-dispersed droplet generation mechanism 170 may be implemented as a micro-cross device, as shown in FIGS. 6A and 6B. While FIG. 6B shows an overview of the micro-cross device, FIG. 6A shows a cross-section through this device, in which the body 602 of the device is visible and having four channels 604, one in each arm of the cross. A corresponding micro-ferrule 606 is provided in each channel 604, to receive a corresponding tubing 172, 174, 176, and 178. A corresponding nut 608 holds each tubing and micro-ferrule attached to the body 602. The micro-ferrules 606 are shaped so that the tips of the micro-ferrules have a smaller diameter than the other parts of the micro-ferrule, which generates mono-disperse water droplets 610 into the crude oil/demulsifier emulsion 620, as shown in the insert of FIG. 6A. In this way, it is possible to generate in a controlled manner, well-defined water droplets having similarly sized exterior diameters, and then to observe the coalescence of these droplets as they travel through the micro-fluidic channel 110. As the water droplets coalescence, their diameter increases, as discussed later, and from the recorded images (still images or videos) it is possible to calculate what percentage of the initial water droplets have coalesced. In one embodiment, an outer diameter of the tubing 172 to 178 is about 1.6 mm and the inner diameter is about 178 µm. Other values for these diameters may be used. Note that although the water is inserted at tubing 176 and the mixture of crude oil and demulsifier is inserted at both tubing 174 and 178 in the embodiment of FIG. 6A, it is possible to have only one water tubing and one crude oil/demulsifier tubing, or other arrangements. Further, note that the amount of water and crude oil/demulsifier may be adjusted from the corresponding pumps 184 to 188. Further, the ratio of the crude oil to demulsifier may be adjusted prior to be being supplied to the corresponding pumps 184 and 188. For example, in one embodiment, the controller 160 may be configured to control a mixer 190, as shown in FIG. 1A or 1B, which is supplied with crude oil from a storage unit 192, and with a demulsifier from a storage unit 194. The controller 160 can instruct the mixer 190 to mix the crude oil with the demulsifier in a desired ratio/concentration and then to supply this ratio/concentration to the pumps 184 and 188. Further, the controller 160 may be further configured to instruct the pump 186 to inject water with a given speed, so that a ratio of the water to the crude oil/demulsifier mixture may be adjusted. In this way, the type of demulsifier and the ratio of the demulsifier to the crude oil and/or the water may be continuously and automatically adjusted by the controller 160.

The mechanism of generating mono-dispersed water droplets 610 in the crude oil/demulsifier mixture 620 with the mono-dispersed droplet generation mechanism 170 is now discussed. To be able to verify whether coalescence has occurred, a very monodisperse water-droplet distribution at the inlet of the micro-fluidic channel 110 is preferred. If this is not the case, then it is difficult to distinguish between large water droplets that did not coalescence and small water droplets that have coalesced. Thus, the mono-dispersed droplet generation mechanism 170 is needed to guarantee that any observed increase in the water droplet size during the gravity-driven descent within the micro-fluidic channel 110 is due to the coalescence of two such water droplets, but not from non-uniform inlet droplets.

For this determination to be unambiguous, the increase in the water droplets diameter when two water drops merge needs to be significantly larger than the spread in the mono-dispersity of the originally generated droplets. When two water droplets of size D coalesce, their combined diameter becomes:

$$D_{new2} 2^{1/3} D = 1.26 D. \quad (1)$$

Furthermore, if N such water droplets coalesce, the resultant water droplet size becomes:

$$D_{newN} = N^{1/3} D. \quad (2)$$

The spread in the droplet sizes at the inlet of the channel 110 will therefore have to be much smaller than the value of 1.26, or at least less than 10% from unity. The mono-dispersed droplet generation mechanism 170 has been configured to accomplish less than this spread. In one application, the mono-dispersed droplet generation mechanism 170 is a micro-intersection (P-899, Upchurch Scientific) which can generate a sequence of mono-disperse water micro-droplets within the crude oil, ranging in size from D=90 µm to D=220 µm, depending on the relative flow-rates of the two phases (continuous liquid $Q_c$, which is the mixture of crude oil and demulsifier, and the dispersed liquid phase $Q_d$, which is the water) and their viscosities, as well as their absolute velocities, all of which may be controlled by the controller 160.

The cross-intersection of the four channels 604 in FIG. 6A is 150 µm in width and the mono-dispersed droplet generation mechanism 170 pumps the water droplets 610 into the micro-fluidic channel 110, where the droplet-droplet interactions take place. The inlets may be 3.0 mm in outer diameter and 1.0 mm in inner diameter. The water droplets are generated by the Plateau-Rayleigh instability with the crude oil being the continuous flow and water being the dispersed one.

The size of the water droplets is principally determined by the flow-rate ratio between the two liquids, i.e., the water $Q_d$ and the crude oil/demulsifier $Q_c$. Thus, the controller 160 can select the size D of the generated water droplets by controlling the speed of the pumps 184 to 188. The demulsifier testing system 100 was tested with a flow-rate ratio $\Phi = Q_d / 2 Q_c$ from as high as 0.33 down to 0.05, which offered a wide range of flow velocities as well as a reasonably large range of droplet sizes.

Figure 7:
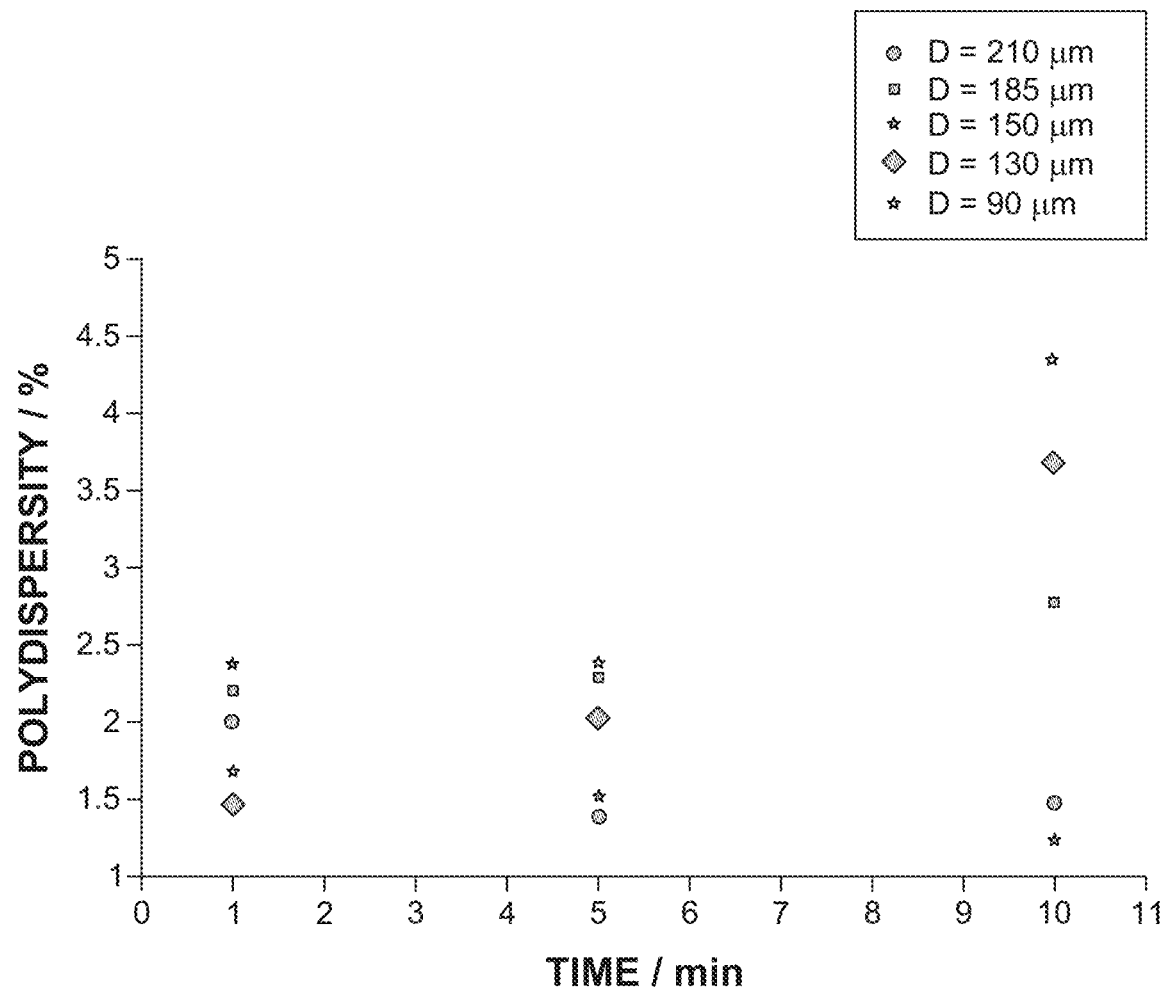
FIG. 7 illustrates how the polydispersity varies in time for various emulsions containing water droplets of different initial sizes.

The mono-dispersity of the droplets entering the micro-fluidic channel 110 was first checked to confirm that the observed droplets at the bottom of the micro-fluidic channel can be relied upon to identify the coalescence. The variation of the polydispersity $\Lambda$ in time, which is defined as the ratio between the standard deviation $\Theta$ and the mean of the droplet diameter $\Omega$, is described by:

$$\Lambda = \frac{\Theta}{\Omega}, \quad (3)$$

and is illustrated in FIGS. 7 and 8 for various droplet diameters D. It is observed that the polydispersity of each diameter D is smaller than 5% over 10 minutes, which indicates that the droplets generated in the demulsifier testing system 100 are highly monodisperse. Note that the smallest droplets, having the size D=90 µm, have the largest relative spread in size because the pixel resolution of the camera used to detect them adds most random noise to measurements of the smallest droplets. However, the observed spread is well within the limits dictated by equation (1). Because the resultant diameter of two original droplets that coalescence is 1.26 times more than the original size D of each droplet, the polydispersity of the system 100 is much lower than 26% threshold required for being able to determine when two droplets have coalesced, which means that the system 100 is reliable in terms of the droplet size difference between individual droplets and coalesced droplets for the statistical analysis.

Figure 9A:
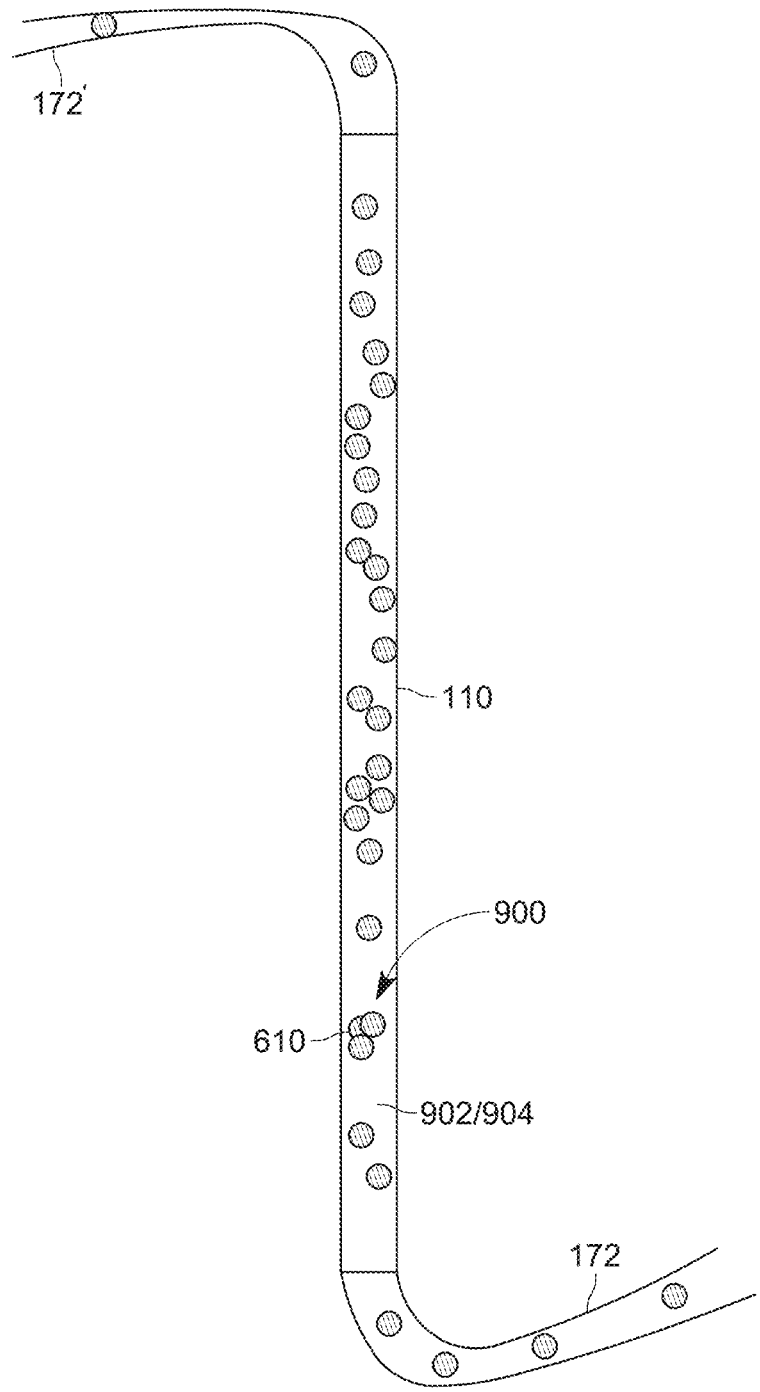
FIGS. 9A to 9C illustrate the movement of the water droplets in a micro-fluidic channel.
Figure 9B:
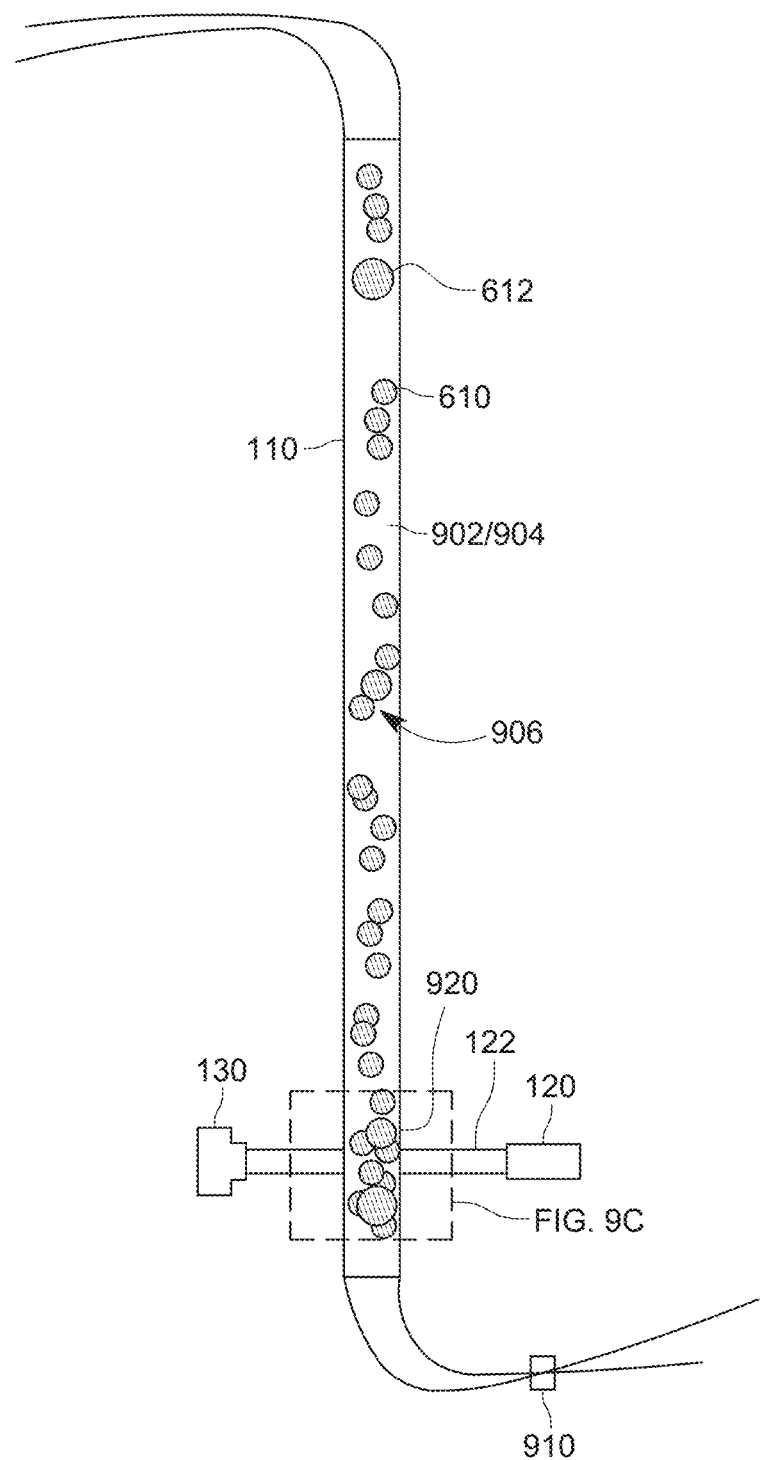

After testing the system for droplet size spread, actual tests have been performed for determining the coalesce probability of the droplets. For these tests, mono-sized water droplets 610 were generated with the mono-dispersed droplet generation mechanism 170 in a mixture 900 of dry crude oil 902 and demulsifier 904 and this mixture 900 was driven by the pump pressure up into the micro-fluidic channel 110 against gravity, as illustrated in FIG. 9A. Note that the micro-fluidic channel 110 is maintained in a vertical position in the demulsifier system 100. However, it is possible that the micro-fluidic channel 110 is maintained in a horizontal position until the mixture is driven through it, and then the channel is rotated to be vertical. In one embodiment, as also illustrated in FIG. 9A, it is possible to connect the tubing 172 not at the bottom of the channel 110, but at its top as tubing 172', and then to pump the mixture from the top of the channel 110. Irrespective of how the mixture 900 and the water droplets 610 are pumped into the channel 110 (from the bottom or the top), after the channel 110 is full with the mixture 900 and the water droplets 610, the bottom part 910 of the channel 110 is clamped so that the mixture cannot escape the channel 110, as shown in FIG. 9B. Further, because the channel 110 is clamped at its bottom, the mean flow velocity of the emulsion is eliminated, even though the droplets and continuous phase can flow relative to each other, driven by weight and buoyancy. The channel can also be angled between 0-90° to reduce the effective gravity.

Figure 9C:
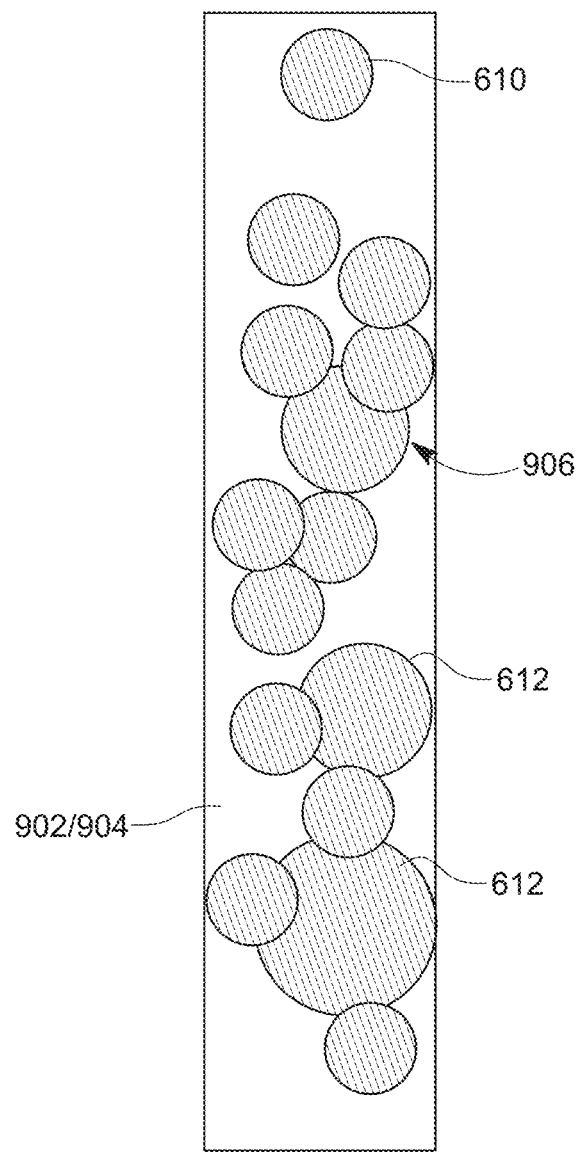

In this way, the water droplets 610 are now in position to fall due to the gravity, toward the bottom part 910 of the channel 110, and in this process, to coalesce with other water droplets 610, to form coalesced water droplets 612. The light source 120 generates the light beam 122, which passes through an observation volume 920 of the channel 110, as shown in FIG. 9B. The observation volume 920 is chosen to be located at the bottom of the channel. The passing light beam arrives at camera 130, which records the images of the various droplets, as schematically illustrated in FIG. 9C. The camera 130's view is fixed at a location close to the bottom of the channel 110 so that there is as long as possible interaction or contact time between the falling water droplets, before their size distribution is recorded. At very low Reynolds numbers in the micro-fluidic channel, the droplets reach their terminal velocity immediately during the freely settling flow. The images of the droplets 610 and 612 are recorded by the sensor of the camera and stored in a memory associated with the system 100, for statistical analysis.

The settling velocity of the isolated droplets can be estimated by balancing the buoyancy force with the weight of the water droplets as follows:

$$F_D = W - F_B, \quad (4)$$

where $F_D$ is the drag force, W is the water-droplet weight, and $F_B$ is the buoyancy force. If these three forces acting on the water droplet reach an equilibrium, the acceleration of the water droplet becomes zero, so that the velocity of the droplet is its terminal velocity. For a spherical water droplet, the three forces noted above are as follows, assuming Stokes' drag law, described:

$$F_D = 3\pi \mu U D \quad (5)$$

$$W = \frac{1}{6}\pi \rho_w D^3 g, \quad (6)$$

$$F_B = \frac{1}{6}\pi \rho_o D^3 g. \quad (7)$$

The terminal velocity $u_t$ is then given by:

$$u_t = \frac{1}{18\mu} D^2 g (\rho_w - \rho_o), \quad (8)$$

where D is the diameter of the droplet, $\rho_w$ is the density of the water, $\rho_o$ is the density of the crude oil, µ is the oil viscosity and g is the gravity. From equation (8), the terminal velocity for a droplet having a diameter of 210 µm is calculated to be 0.73 mm/s and for a 90 µm particle, the terminal velocity is calculated to be 0.13 mm/s. Both of these velocities are larger than the measured velocities, which means that the shear force due to the presence of the walls of the channel 110 should also be considered.

These theoretical estimates are likely to underestimate the drag, as the confinement of the channel walls increase the viscous stress, as compared to isolated droplets in an infinite pool. For this reason, in one embodiment, the interior walls of the channel 110 may be treated with a substance to prevent wetting of the water on the wall, to minimize the influence of the channels walls on the movement of the water droplets. Furthermore, in the experiments, the water droplets are originally approximately uniformly distributed in the pressure-driven stream moving up along the micro-fluidic channel 110. The weight of the droplets 610 will pull them down during their rise up into the channel. In other words, the number density of the droplets will increase slightly as the mixture 900 travels up the channel 110. However, during the slow gravity-driven settling of the droplets 610 down the channel 110, as shown in FIG. 9B, the concentration of the droplets increases when they move towards the bottom region of the channel 110. In addition, it was observed that the droplets tend to group together (see element 906 in FIGS. 9B and 9C) and move as a conglomerate. This process increases considerably the interaction time of the droplets. For a low-concentration of the droplets, they will interact less, but shear past each other, as they are located at different distances from the channel wall, experiencing different parts of the parabolic laminar profile. This will usually lead to short-term interactions. On the other hand, when the conglomerations occur, the droplets move together and their surfaces are pressed against each other for a much longer time, which allows the intervening oil film to drain away to allow contact between drops and subsequent coalescence.

Figure 10:
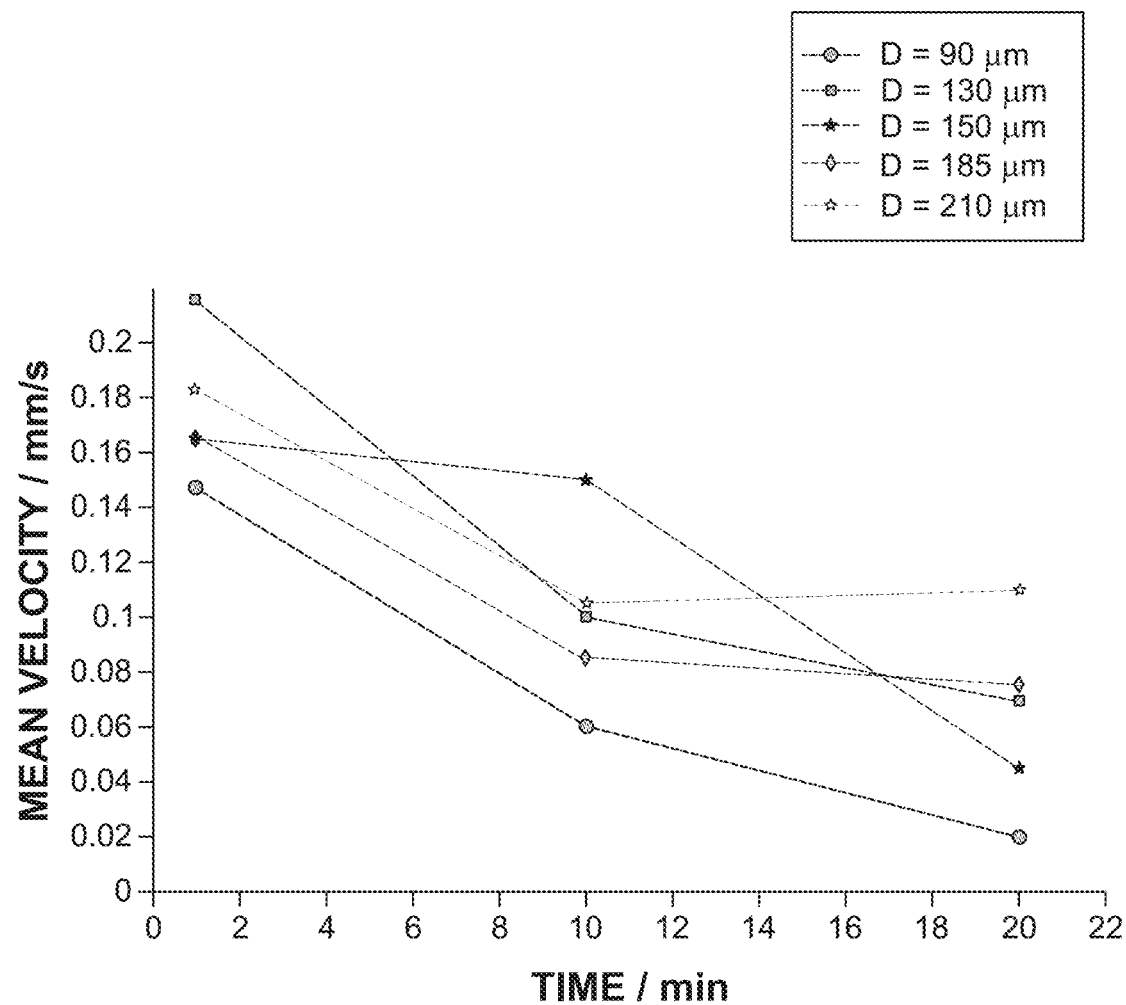
FIG. 10 illustrates the mean velocity of the water droplets as they fall under gravity inside the micro-fluidic channel, versus time.

The conglomerates 906 will also fall slower than isolated droplets 610, as the continuous phase must move up between the droplets, to satisfy the continuity in the tube. This flow between the droplets is driven by the additional pressure drop, which counteracts the weight and slows down the motion. Note that this is the opposite to what might be expected for conglomerates of droplets in an infinite pool. In this case, the effective density of these conglomerates increases thereby accelerating them. FIG. 10 shows the average droplet velocity, observed in the bottom view illustrated in FIG. 9C, versus time, from the start of the settling motion, for different droplet sizes D.

After performing these tests for various demulsifiers, ratios of water to crude oil and demulsifier, and/or ratio of crude oil to demulsifier, the recorded data needs to be analyzed and the coalescence of the water droplets evaluated for determining which demulsifier and in which concentration, is the best for separating the water by drop coalescence from a given type of crude oil. For this analysis, the droplet size-distribution of the water is processed at different time intervals during the freely settling phase, after the supplying flow to the channel 110 has been stopped. This analysis can be performed for different droplet diameters, such as D=220 µm, 170 µm, 150 µm, 130 µm and 85 µm, which are close to the size order of the real water droplets in the actual water-oil emulsions.

From the recorded data, it was observed that the total number of coalescences increases with time, as one would expect. It was observed from the images collected during the tests that repeated coalescences occur and as time goes on, double droplets coalesce with the original size droplets, to form triplets of $3^{1/3}$—sizes, as predicted by the theory. This will continue to make even larger droplets. This process is observed for all the larger droplets. In this determination, the droplets which appear in the view of the camera 130 have been tracked over 5 minutes time-intervals. These time intervals were centered around 3.5, 12.5 and 17.5 minutes after the pressure-driven flow has been stopped in the channel 110. The time interval can be chosen either shorter or longer as necessary for the statistical measurement. For this determination, the fractions of droplets having the original size and those having an increased size, which flow through the control volume 920, were identified and counted. The diameter of the coalesced droplets are n times larger than the original size D as discussed above. Therefore, a coalescence probability can be defined as:

$$P = \frac{2n_2 + \ldots + kn_k}{n_0}, \quad (9)$$

where P stands for the coalescence probability, $n_k$, with k taking an integer value larger than 1, stands for the coalesced droplets formed by k original drops, and $n_0$ is the total number of the original mono-sized drops. During the analysis of the recorded data, it was observed that very rarely do original drops coalesced to form a droplet having more than three times the size of the original drops, unless a demulsifier was added. However, when an appropriate demulsifier has been added, droplets were observed having a diameter $20^{1/3}$ or more larger than that of the original drops.

Using the demulsifier testing system 100 with the processes described above, it was possible to test, for a given crude oil, various types and quantities of demulsifiers and to select the most appropriate one for the given crude oil, without the need to resort to the traditional bottle test. The demulsifier test system 100 can be made to automatically and independently perform all these experiments and then to calculate the coalescence fraction for each tested demulsifier and for each concentration, and in the end, to select the demulsifier and its corresponding concentration that achieves the optimum coalescence probability vs cost.

Figure 11:
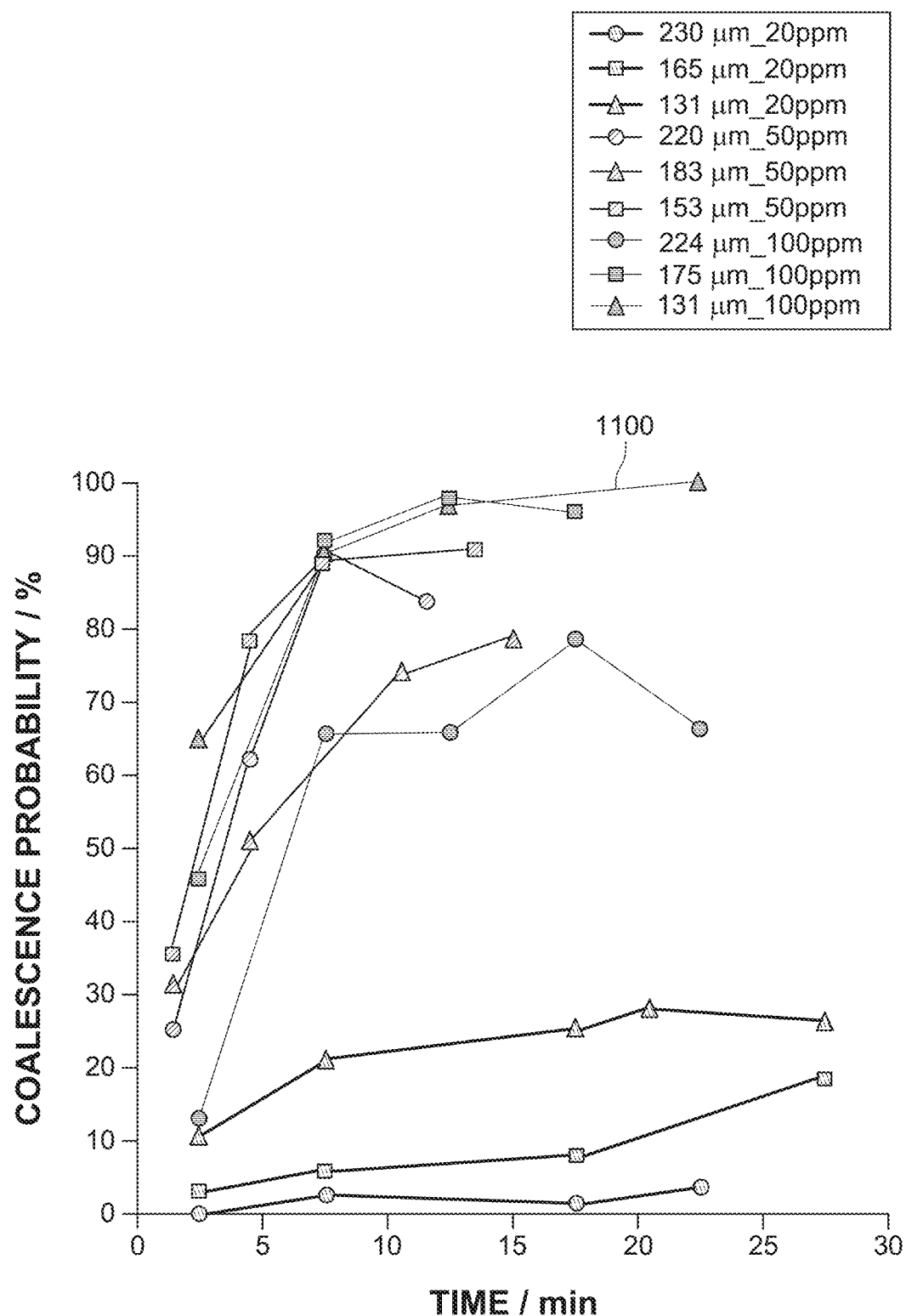
FIG. 11 illustrates a coalescence probability for various emulsions over time, as measured with the demulsifier testing system shown in FIG. 1A.

In one set of tests, the dosage of the demulsifier ranged from 20 to 100 ppm (parts-per-million). During the test, the system generated and tested different sizes of the mono-sized droplets, ranging from ~150 µm to ~230 µm. Note that different diameters were generated and tested in a sequential order and not all at the same time. As illustrated in FIG. 11, the coalescence properties of the droplets in the water-oil emulsion varies for different concentrations of the demulsifier. It is noted that fewer droplets coalescence occurs with 20 ppm demulsifier dissolved in the crude oil than 50 ppm and 100 ppm. The coalescence is also sensitive to the droplet diameter, which for this example shows that the smaller drops tend to coalesce more. However, this it is not always the case as indicated by the 50 ppm of demulsifier. It was further observed that as more demulsifier was added, the earlier the drops tend to coalesce. With the new system 100, the selection of the demulsifier is becoming visible and it is possible to capture the coalescence in the dynamic sheared flow, which is closer to the industrial condition than the traditional bottle test. Also, this test is faster and more versatile than the existing tests.

Figure 12:
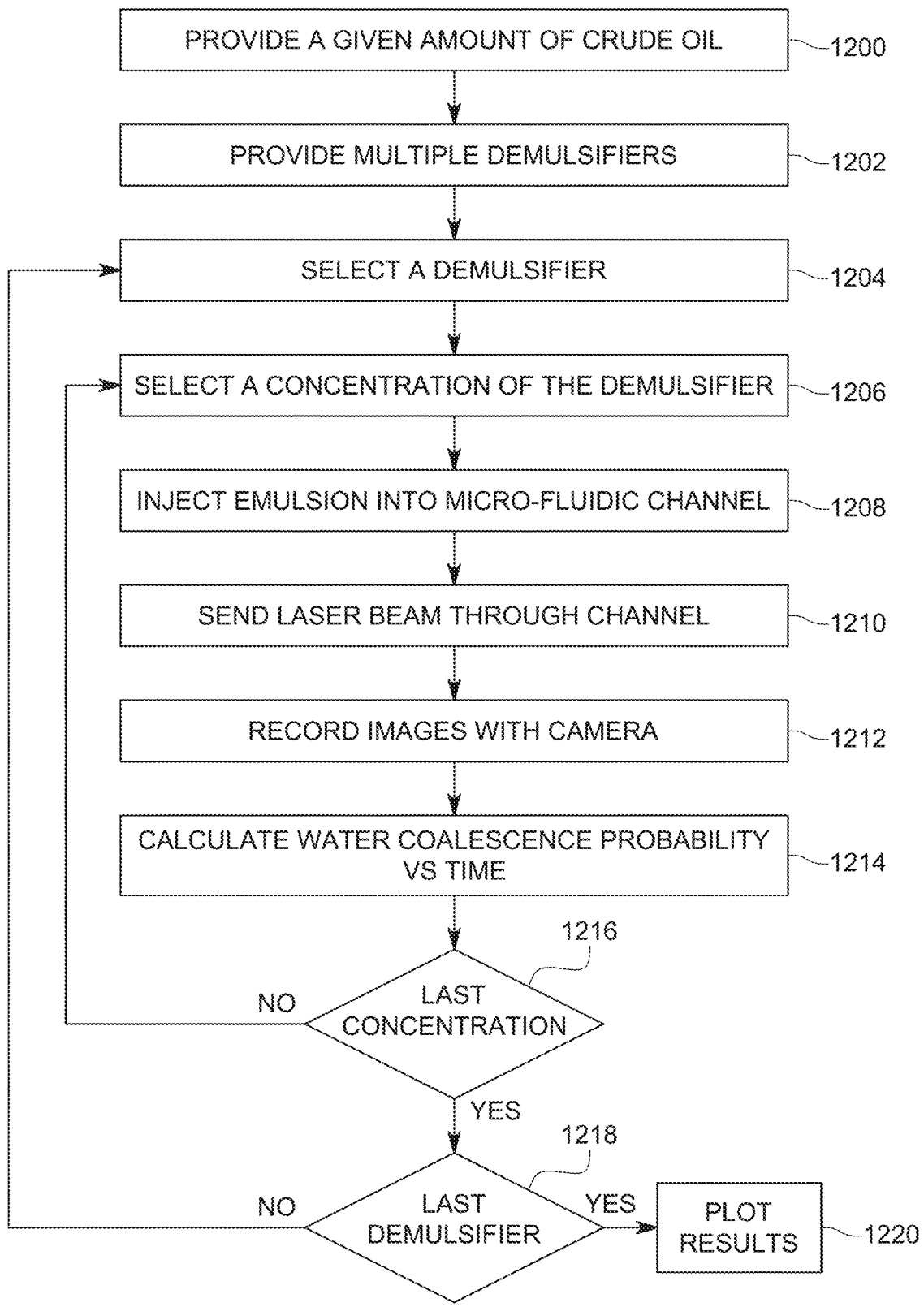
FIG. 12 is flowchart of a method for measuring the coalescence of various emulsions.
Figure 13:
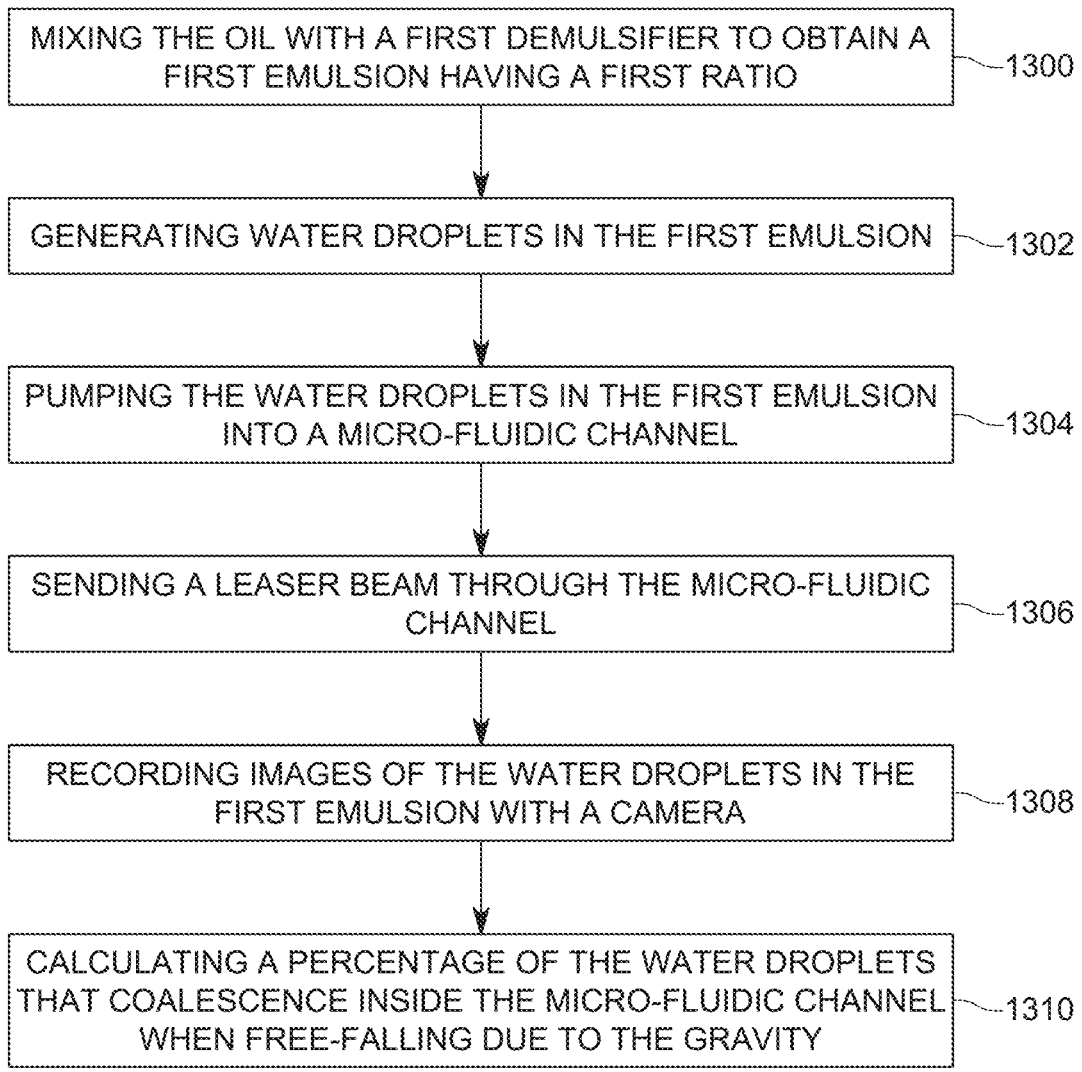
FIG. 13 is a flowchart of a method for selecting a best demulsifier and its concentration/ratio to be added to oil for separating the water from the oil.

A method for determining which type of demulsifier and its concentration to be used for separating water from a given crude oil is now discussed with regard to FIG. 12. The method uses the demulsifier testing device 100 discussed above. The method starts in step 1200, in which a certain type of crude oil is provided at storage unit 192. The given crude oil has no water in it, i.e., it is pure oil. In step 1202, plural demulsifiers are made available to the storage unit 194. In step 1204, the controller 160 selects a first demulsifier and in step 1206 the controller selects a first concentration of the demulsifier, and mixes the first demulsifier from storage unit 194 with the crude oil in the storage unit 192. The mixture of crude oil and demulsifier is then injected in a mono-dispersed droplet generation mechanism 170.

Water is also injected this mechanism so that mono-dispersed water droplets are generated in the crude oil. The obtained emulsion is then injected in step 1208 into a micro-fluidic channel 110, and after the channel is filled with this emulsion, its lower end is clamped shut. Then, in step 1210, an NIR laser beam is sent through a bottom region of the channel 110, and images of the water droplets falling through the crude oil in the channel 110 are recorded with a high-speed camera 130 in step 1212. The controller 160 or the operator of the system then counts in step 1214 the fraction of water droplets that have coalesced, inside an observation volume, for a given amount of time. In step 1216, the controller checks whether the tested concentration was the last one to be tested for the selected demulsifier. If the answer is no, the process returns to step 1206 and selects a new concentration. If the answer is yes, the process advances to step 1218 to determine whether the last demulsifier has been tested. If the answer is no, then the process returns to step 1204 to select another demulsifier and repeat the previous steps. If the answer is yes, the system plots the results, for example, as illustrated in FIG. 11. Then, the operator or the controller selects the best demulsifier and the best concentration, for example, for the largest coalescence probability as illustrated in FIG. 11. For example, curve 1100 in FIG. 11 is considered to be the best and thus the controller or the operator selects the demulsifier and concentration associated with this curve as being the best demulsifier for the given crude oil. The curves in FIG. 11 can also be used to select the minimum concentration required to achieve a certain coalescence probability, like 90%, to minimize the cost of the demulsifier. Note that the method discussed with regard to FIG. 12 can test many demulsifiers and many associated concentrations for any given type of crude oil.

As apparent from the above discussions, the novel demulsifier testing system 100 and the method discussed with regard to FIG. 12 have one or more of the following advantages:

1. The most common testing method used to select a demulsifier for a given oil-water emulsion is the laboratory "bottle test". This is essentially a static test (after first stirring the emulsion), i.e., the emulsion sits in the bottle over time, without forcing any repeatable shearing motions. The method discussed with regard to FIG. 12 uses a gravity-driven setup that generates shearing between adjacent water droplets, which better simulates the actual dynamics of the real flow in actual oil-water separator vessels, which likely would produce more reliable results for field testing.

2. Using micro-fluidic channels requires only minute amounts of the demulsifiers to be tested.

3. The "bottle-test" requires many hours to achieve a result, whereas the micro-fluidic channel testing only takes dozens of minutes to test many demulsifiers and many corresponding concentrations.

4. The method discussed herein can be set up to test multiple emulsion concentrations simultaneously, as discussed with regard to FIG. 1B, by designing adjacent micro-channels, which automatically test crude oils with different demulsifier concentrations directed into side-by-side microchannels.

5. The novel method discussed herein uses monodisperse droplet sizes and can therefore be used to show the influence of droplet sizes on the coalescence efficiency of each demulsifier. This is not possible in the traditional "bottle test."

A method for determining a demulsifier and its concentration/ratio in an emulsion that is most efficient for separating water from oil is now discussed with regard to FIG.

13. The method includes a step 1300 of mixing the oil with a first demulsifier to obtain a first mixture having a first ratio, a step 1302 of generating water droplets in the first mixture, a step 1304 of pumping the water droplets in the first mixture in a micro-fluidic channel, a step 1306 of sending a laser beam through the micro-fluidic channel, a step 1308 of recording images of the water droplets in the first mixture with a camera, and a step 1310 of calculating a percentage of the water droplets that coalescence into the micro-fluidic channel when free-falling due to the gravity.

The method may further include a step of repeating the above steps for additional ratios of the crude oil and the first demulsifier and also for additional demulsifiers, and/or comparing the percentage of the water droplets that coalescence into the micro-fluidic channel for the various ratios and various demulsifiers, and/or selecting the demulsifier and the ratio that have a highest percentage of coalesced water droplets in the oil, and/or pumping the water droplets in the first mixture against gravity, and/or clamping a bottom region of the channel to prevent the water droplets and the first mixture to flow out of the channel, and/or placing a fixed diffuser between a laser source that generates the laser beam and the channel, and placing a movably diffuser between the laser source and the channel to diffuse the laser beam.

In one application, the laser beam is near-infrared light. The method may further include a step of mixing two streams of the first mixture with a stream of water to form the water droplets. In one embodiment, the micro-fluidic channel includes plural channels arranged in parallel. In another embodiment, at least two sides of the micro-fluidic channel are less than 1 mm. It is also possible that a cross-section of the micro-fluidic channel is a square or a rectangle.

The disclosed embodiments provide a demulsifier testing device and corresponding method that are used for testing plural demulsifiers and plural concentrations for separating the water from a given sample of crude oil. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] D N Loufakis, A K Schmitt, C Nelson, S Hoyles, J Goodwin, B White, and C Ayers., A microfludic technique for the evaluation of demulsifiers. In SPE International Conference on Oilfield Chemistry. Society of Petroleum Engineers, 2017.

[2] Y Zhao, J Yang, J Q Wang, and F X Gui, High-accuracy low-water-content measurement of crude oil based on a near-infrared spectral absorption method. *Optical Engineering*, 43(10):2216-2217, 2004.

[3] J S Aquino, C N Pessoa, G V Araujo, P S Epaminondas, A P Schuler, A G Souza, and T L Stamford, Refining of buriti oil (mauritia exuosa) originated from the brazilian cerrado: physicochemical, thermal-oxidative and nutritional implications. *Journal of the Brazilian Chemical Society*, 23(2):212-219, 2012.

What is claimed is:

1. A method for selecting a demulsifier and a demulsifier concentration that is most efficient in separating water from oil, the method comprising:
   mixing crude oil with a demulsifier to obtain a mixture having a first concentration;
   generating water droplets inside the mixture;
   pumping the water droplets and the mixture into a micro-fluidic channel;
   sending a laser beam through the micro-fluidic channel;
   recording, with a camera, images of the water droplets in the mixture while in the micro-fluidic channel; and
   calculating a percentage of the water droplets that coalescence inside the micro-fluidic channel when free-falling through the mixture within the micro-fluidic channel, due to gravity.

2. The method of claim 1, further comprising:
   repeating the steps of claim 1 for additional concentrations of the demulsifier into the crude oil and also for additional demulsifiers.

3. The method of claim 2, further comprising:
   comparing the percentage of the water droplets that coalescence inside the micro-fluidic channel for the additional concentrations and the additional demulsifiers.

4. The method of claim 3, further comprising:
   selecting a demulsifier and a concentration that have a highest percentage of coalesced water droplets in the crude oil.

5. The method of claim 1, further comprising:
   pumping the water droplets and the emulsion into the micro-fluidic channel against the gravity.

6. The method of claim 1, further comprising:
   clamping a bottom region of the channel to prevent the water droplets and the emulsion to flow out of the channel.

7. The method of claim 1, further comprising:
   placing a fixed diffuser between a laser source that generates the laser beam and the channel; and
   placing a movable diffuser between the laser source and the channel to diffuse the laser beam.

8. The method of claim 1, wherein the laser beam is near-infrared light.

9. The method of claim 1, further comprising:
   combining two streams of a demulsifier-oil mixture with a stream of water inside a microfluidic cross-junction to form the water droplets.

10. The method of claim 1, wherein the micro-fluidic channel includes multiple channels arranged in parallel.

11. The method of claim 1, wherein at least two sides of the micro-fluidic channel are less than 1 mm.

12. The method of claim 1, wherein a cross-section of the micro-fluidic channel is a square.

* * * * *